United States Patent
Przada et al.

(10) Patent No.: US 8,537,948 B2
(45) Date of Patent: Sep. 17, 2013

(54) CLOCK SYNCHRONIZATION IN SHARED BASEBAND DEPLOYMENTS

(75) Inventors: Jaroslaw Przada, Stittsville (CA); Glen Rempel, Kanata (CA); Ken Huisman, Kanata (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 191 days.

(21) Appl. No.: 13/287,364

(22) Filed: Nov. 2, 2011

(65) Prior Publication Data
US 2013/0107998 A1    May 2, 2013

(51) Int. Cl.
*H04L 7/04* (2006.01)
(52) U.S. Cl.
USPC ........... 375/362; 375/354; 375/355; 375/356; 375/365
(58) Field of Classification Search
USPC .................. 375/354, 355, 356, 362, 365
See application file for complete search history.

(56) References Cited

U.S. PATENT DOCUMENTS

| | | | |
|---|---|---|---|
| 6,167,048 A * | 12/2000 | Law et al. ............... | 370/395.62 |
| 6,980,616 B1 * | 12/2005 | Nakano et al. ............ | 375/364 |
| 7,424,076 B2 * | 9/2008 | Scheffel ................... | 375/356 |
| 2009/0245228 A1 | 10/2009 | Osterling | |
| 2009/0279529 A1 | 11/2009 | Hamalainen et al. | |

OTHER PUBLICATIONS

PCTIB2012055810 International Search Report.

\* cited by examiner

*Primary Examiner* — Ted Wang
(74) *Attorney, Agent, or Firm* — Jean-Pierre Fortin; Ericsson Canada Inc.

(57) ABSTRACT

A method and an interface unit is provided to maintain timing synchronization between a first Radio Equipment Controller (REC) and a second REC operating with a multi-standard base station. The first REC receives a synchronization signal and synchronized data output is generated from the synchronization signal. A clock signal is then generated from the synchronized data output. At the second REC, the synchronized data output is received and a synchronization source is then reconstructed from the first clock signal. A timing and frequency component of a second clock signal is then aligned to that of the reconstructed synchronization source, such that the second REC can maintain synchronization with the first REC.

12 Claims, 6 Drawing Sheets

CLOCK SYNCHRONIZATION IN SHARED BASEBAND DEPLOYMENTS

FIELD OF THE INVENTION

The present application relates generally to clock synchronization and, more specifically, to clock synchronization in shared baseband deployments.

BACKGROUND OF THE INVENTION

Network operators upgrading their networks from 2G/3G networks to 4G networks; want a network evolution solution which permits the leveraging of a portion of their installed baseband equipment. In some cases this means that multi-standard mixed mode radios are used to support efficient in-band combining to ease the service transition from 2G/3G equipment to 4G equipment. Emerging deployments of shared radio solutions for base stations operating on multiple standards face particular challenges in relation to operating on a common clock synchronization. Each standard usually run from its own clocking domain.

When the timing or synchronization reference is temporarily lost, a network's ability to maintain time and sync stability becomes critical to ensure continued optimal network performance. The time period that a network is able to maintain time and sync stability without a reference is called the holdover time.

Precise synchronization is especially critical in mobile networks for the successful call signal handoff and proper transmission between base stations, as well as for the transport of real-time services. If individual base stations drift outside the specified frequencies, mobile handoff performance decays, calls interfere, and calls cannot be made, resulting in high dropped-call rates and impaired data services. In the event that timing or synchronization reference is temporarily lost, a network's ability to maintain time or "holdover" becomes critical to ensure optimal network performance.

These synchronization issues are further dilapidating in shared baseband deployments since holdover requirements are not standard; they vary depending on the system type, complexity, and operator's requirements. In shared baseband deployments, two heterogeneous systems with independent synchronization inputs are expected to produce outputs which are synchronized to one another, typically so that they can be combined together without loss of data. Existing clock synchronization solutions provide limited holdover capabilities in the case where one or both of the systems lose their synchronization inputs, leading to the outputs becoming unsynchronized with each other.

For these reasons, traditional synchronization has limited capabilities in situations as described above.

SUMMARY OF THE INVENTION

The present invention is directed to alleviating the problems of the prior art.

The present invention overcomes the problems of the prior art by providing a method of synchronization wherein synchronization is provided from one system to the other by recovering a clock from one system's output, then using that synchronization to regenerate a synchronization source for the other system. This allows synchronization between systems to be maintained even in the case where the input synchronization source is lost. In addition, if the timing source of one system starts to drift with the lost of a GPS signal, the second system will drift along with it such that the timing remains consistent between the two networks.

In accordance with an embodiment of the present invention, there is provided a method of providing timing synchronization between a first Radio Equipment Controller (REC) and a second REC operating with a multi-standard radio. A synchronization signal is received from a first synchronization source and a synchronized data output derived from the synchronization signal is generated. A first clock signal is generated from the synchronized data output. A synchronization source is then reconstructed from the first clock signal. A timing and frequency component of a second clock signal is then aligned to that of the reconstructed synchronization source, such that the second REC can maintain timing synchronization with the first REC.

1. In accordance with another embodiment of the present invention, there is provided a system for providing timing synchronization between a first Radio Equipment Controller (REC) and a second REC operating with a multi-standard radio. The system comprises radio means for receiving a synchronization signal from a first synchronization source and first synchronization means for generating a synchronized data output derived from the synchronization signal. A second synchronization means is used for generating a first clock signal from the synchronized data output and means for reconstructing a synchronization source from said first clock signal is provided. The system further comprises means for aligning a timing and frequency component of a second clock signal to that of the reconstructed synchronization source, such that the second REC can maintain timing synchronization with the first REC.

Other aspects and features of the present invention will become apparent to those of ordinary skill in the art upon review of the following description of specific embodiments of the invention in conjunction with the accompanying figures.

DETAILED DESCRIPTION OF THE EMBODIMENTS

In order to lighten the following description, the following acronyms will be used:
1PPS One Pulse per second
BTS Base Station
CBTS CDMA Base Station
LTE REC Digital Radio Unit LTE
GPS Global Positioning System
HSSL High Speed Serial Link
OCXO Oven Controlled Crystal Oscillator
PHY Physical Interface
VCXO Voltage Controlled Crystal Oscillator
MU Multiplexer Unit As indicated above, the present invention addresses the issues brought out by the aforementioned prior art.

Figure 1:
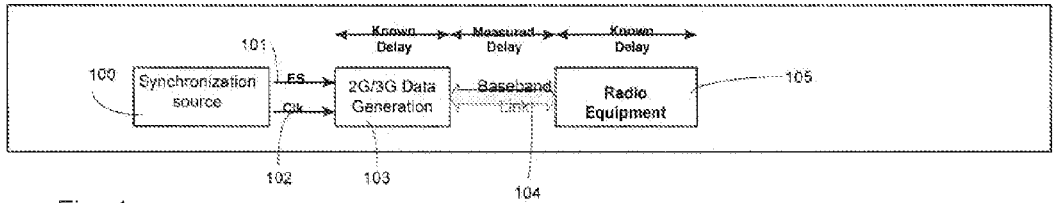
FIG. 1 is a block diagram illustrating the timing principles of a 2G/3G radio.

With reference to FIG. 1, we have shown a block diagram illustrating the timing principles of a 2G/3G radio. A timing source 100, such as GPS signal creates an ES (even second) mark 101 synchronized to GPS time, along with an associated (phase-locked) clock 102. It provides these signals to the 2G/3G Data generation equipment 103, which uses them to generate the required codes with an advance with respect to this mark. The amount of this advance is determined by the delay of the radio and the optical fibre—the BaseBand Link 104 to the radio equipment 105.

Figure 2:
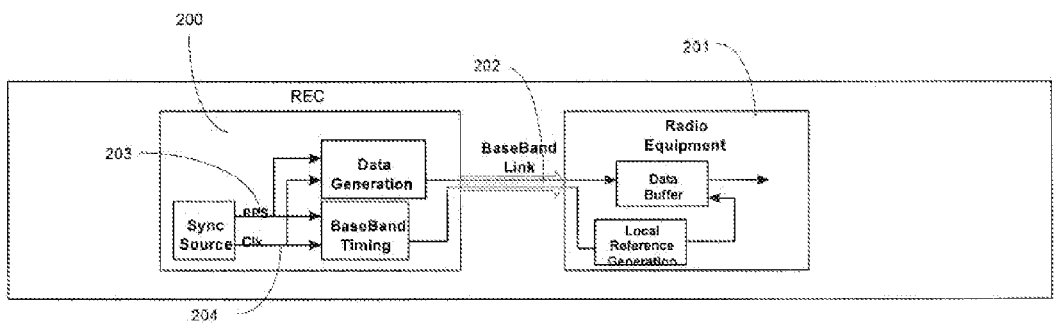
FIG. 2 is a block diagram illustrating the timing principles of an 4G radio.

With reference to FIG. 2, we have shown a block diagram illustrating the timing principles of a 4G radio. In this case, a Radio Equipment Controller (REC) 200 is connected to the Radio Equipment (RE) 201 via a Baseband link 202. The REC likewise has a time alignment requirement, although this is only for (TDD) time division duplex mode. The REC 200 receives a GPS timing reference consisting of a PPS (pulse per second) signal 203 and associated clock 204. These signals are used to generate the framing information for the Baseband link. At the radio side 201, a local timing reference is created. An offset needs to be applied to this timing reference to make it match up with the REC time. To determine this number, the REC measures the delay of the Baseband link. Also, the radio equipment tells the REC what its delay is. The REC then sends a message to the radio to tell it how much to advance it's time base, and where to find the first sample of the downlink (DL) frame in the baseband frame.

Figure 3:
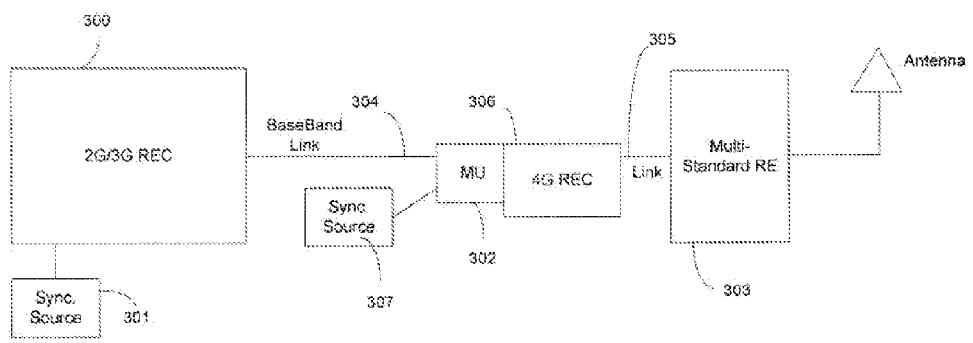
FIG. 3 is a block diagram illustrating a high level topology of a base station radio system according to the present invention.

With reference to FIG. 3, we have shown a block diagram illustrating a high level topology of a multi-standard base station radio system according to the present invention.

In the embodiment of FIG. 3, the radio system is comprised of a 2G/3G REC 300 which, as an example, may continue to be serviced by a wireless operator wanting to maintain a 2G/3G network but considering expanding its network to include 4G services. The 2G/3G REC continues to receive timing signals from a GPS Time Source 301.

An interface 302, hereinafter referred to as a multiplexer unit (MU) is provided as an interface that provides the ability to co-locate 4G traffic with 2G/3G traffic on a shared radio 303. As indicated previously, one of the requirements for this configuration is that timing must be consistent between the two networks. Since both networks use separate GPS sources for timing, there is a need for a common synchronization between the 2G/3G REC 300 and the 4G REC 306. The 2G/3G REC generates its timing source on one baseband link 304 whereas the 4G REC makes use another baseband link 305 but both are intended to share a common multi mode radio 303. As described earlier, a problem can exist when the GPS signal or sync of one source is lost or unavailable. Timing signal drift is enough to cause FIFO overflow problems. As will be explained further below, synchronization can be achieved by linking the timing between the 2G/3G REC 300 and the 4G REC 306.

In the preferred embodiments to be described further below, the MU is used to co-locate CDMA traffic with LTE traffic. It will be understood to those knowledgeable in the art that 2G/3G traffic other than CDMA can also be co-located with an LTE or other 4G traffic according to the teachings of the present invention.

The following description makes use of the terms HSSL (High Speed Serial Link) and CPRI (Common Public Radio Interface). Both HSSL, a proprietary communications protocol and CPRI define the interface of base stations between the Radio Equipment Controllers (REC), to local or remote radio units, known as Radio Equipment (RE) and may also be referred to as baseband link in the following description.

Figure 4:
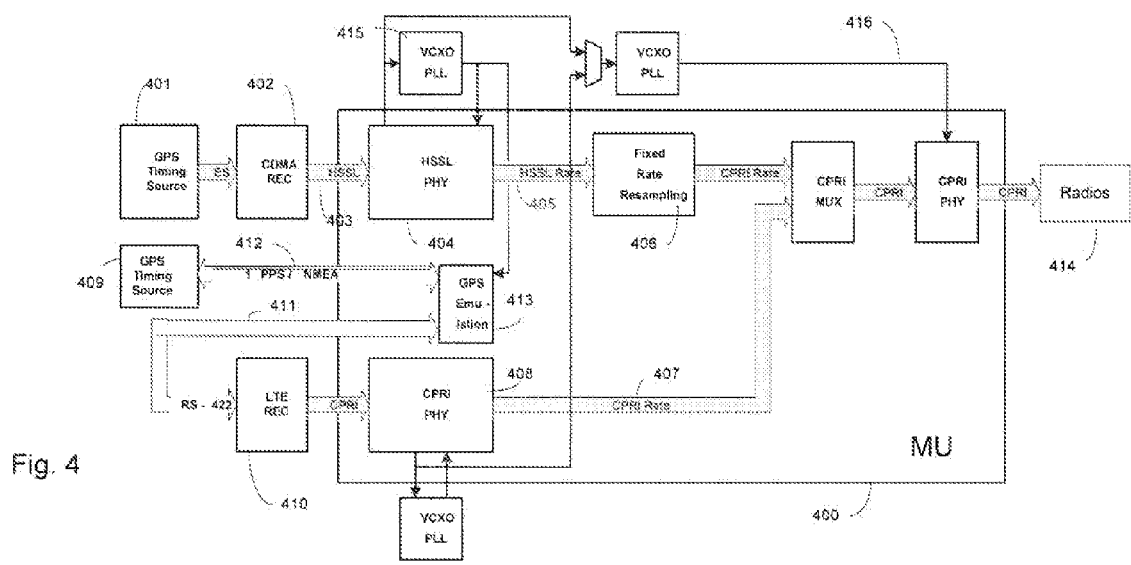
FIG. 4 is a block diagram of an Multiplexing Unit (MU) according to the present invention.

With reference to FIG. 4, we have shown a block diagram of the MU 400, which is used as interface between the CDMA REC and LTE REC to synchronize the timing between the baseband units. A GPS source 401 provides an ES (even second) mark synchronized to GPS time to CDMA REC 402. Similarly, GPS source 401 makes use of a received satellite GPS signal to generate a phase-locked clock signal. An HSSL baseband link 403 is generated using this clock. The VCXO PLL 415 is locked to the CDMA clocking and a 1PPS signal is derived from the VCXO, block 413. A 1PPS signal is output at the rate of 1 pulse per second every 1 second. This reference clock signal is fed to the HSSL PHY 404 to create an HSSL rate 405 with VCXO PLL 415 at the egress side the HSSL PHY. It is also used as the reference clock 416 on the radio side.

If there is no consistent timing from the clocking signal of the baseband link 403, the actual rate which would be coming out from the fixed rate re-sampling block 406 could vary and also affect the CPRI rate 407 coming from the CPRI PHY 408 by an amount related to the difference in the timing.

At the LTE equipment side, the GPS source 409, normally connected to the LTE DEC 410 is instead connected to the MU 400, and the MU connects via link 411 to the LTE DEC 410 on the port normally used by GPS source 409 to provide the 1PPS and NMEA messages directly.

The MU 400 has the ability to select the incoming pulse it wants to use from one of two possible sources, one from a synthetic PPS recovered from the HSSL baseband link 403 and one from the GPS source 409. As will be explained further below, this selection will depend on the condition of the clock source and the timing difference between the various pulses.

At the LTE DEC 410, a set of NMEA messages 412 is received from the GPS source 409 in addition to the 1PPS pulse. This is accomplished by passing the NMEA messages 412 from the GPS source 409 to the LTE DEC 410 via a GPS Emulation block 413. The data in the messages passed through are cached in case the GPS fails in some way and stops sending messages. It should be noted that the system software is responsible for caching the nmea messages which are logically cached in block 413 even though FIG. 4 is more of a hardware block diagram. Even with the GPS source 409 connected to the MU 400, the MU 400 can choose to generate the 1PPS to the LTE DEC 410 either from the connected GPS source 409 or using a synthetic 1PPS generated from the HSSL baseband link timing 403. Although the HSSL source is preferred over the GPS source (once the phase of the HSSL source is aligned with the GPS), if the HSSL source 403 fails, the MU will make use of the GPS timing source 409. If the HSSL timing source 403 starts to drift, the CPRI side will drift along with it since one is synchronized with the other.

In the preferred embodiment, HSSL timing 403 is preferred, as using it allows for consistent timing between the CDMA DEC 402 and LTE DEC 410, even if the CDMA DEC 402 goes into holdover mode and drifts (the LTE DEC 410 will follow the drift). The selected timing will be output to the radios 414 with the CPRI baseband link that carries the data for both the CDMA and LTE networks.

Notwithstanding the presence of the GPS source 409, a 1PPS source at link 411 is generated artificially via a synthetic pulse generated by GPS Emulation block 413. This pulse will be based on the timing signal received from the HSSL links 403. To create the 1PPS from the HSSL link, a synthetic 1PPS is generated at GPS Emulation block 413 using the PLL 415 that is locked to the HSSL link 403.

The GPS Emulation block 413 provides a set of registers that can be used to measure the phase offset between the 1PPS 412 of the GPS source 409 (if available) and the synthetic 1PPS.

The steady state behavior of the system is to derive the timing from the HSSL link 403. On startup, once the GPS source 409 connected to the MU 400 has initialized, and an HSSL link 403 is available, the system will align the phase of the HSSL-derived synthetic PPS 403 and the GPS PPS 412 and then switch over to use the synthetic PPS for timing. It will continue to do so unless a clock signal failure occurs, in which case a different timing source will be used as will be explained further below.

The recovered clock from the HSSL recovers rate and not phase. In order to recover phase, the synthetic PPS is aligned to the incoming GPS PPS. The synthetic PPS is issued based on a down-counter located in the GPS emulation block 413. This counter is timed from the VCXO that is locked to the incoming HSSL clock rate (415 in FIG. 4). The counter counts from 0×79dffff to 0. When the counter reaches 0×3cf0000 the synthetic pps is emitted ("PPS Output Time").

When the gps 1PPS comes in, the value of the down-counter is written to the gps offset register in the GPS emulation block 413. In addition, a 1 is written to the most significant bit, and the previous most significant bit is copied to the second-most significant bit. Using this information, you can determine:
a) how far off the synthetic PPS is from the GPS PPS
b) if there was a PPS emitted from the GPS in the last 1.5 seconds To adjust the synthetic PPS, there is an adjustment register that will, for one second only, change the start value of the down-counter from 0×79dffff to a larger or smaller number programmed by the software. A smaller number means the synthetic pps will come out sooner (this is expected if the GPS PPS is being emitted before the synthetic PPS), a larger number means it will take longer for the synthetic pps to be emitted (which is expected when the GPS PPS is being emitted after the synthetic pps). The following steps are then performed:
a) wait for PPS signal from GPS.
b) before the HSSL link is available, move the synthetic PPS as close to the GPS as possible. Note the HSSL link is not up so the synthetic PPS will wander away. This is attempted 8 times.
c) Wait for HSSL link to come up.
d) Collect 60 measurements of the offset between the GPS and synthetic PPS pulses
e) For each measurement:
i. If the register value is >0×3cf0000 and the MSB is 0, discard. (this means there was no PPS from the GPS this second)
ii. If the register value is <0×3cf0000 and the MSB and SMSB are 0, discard. (this means there was no PPS from the GPS this second).
iii. Otherwise, add the measurement to a list of measurements until 60 are available.
f) Wait for HSSL link to come up.

After 60 measurements are available, discard outliers. Outliers are calculated the standard statistical way (with an exception):
a) For measurement value M, where Q1 and Q3 refer to the first and third quartile:
b) D=1.5*(Q3−Q1), and,
c) If M>Q3+D or M<Q1−D, and M is not less than 7 ticks (about 50 ns) from the median, then M is deemed an outlier and discarded.

Recompute mean after discarding outliers and use mean value to determine how far to move the synthetic PPS towards the GPS PPS.

To adjust the PPS:
a) If the computed mean is <7 ticks (about 50 ns) different from the PPS output time, do nothing—the PPS is lined up and the process is complete. Otherwise:
b) If the computed mean is >PPS output time, reduce PPS counter value by (mean−0×3cf0000) ticks. If it is <PPS output time, increase PPS counter value by (0×3cf0000−mean) ticks.
c) If an adjustment was made, collect another 60 samples and repeat, until an adjustment is not required.

Figure 5A:
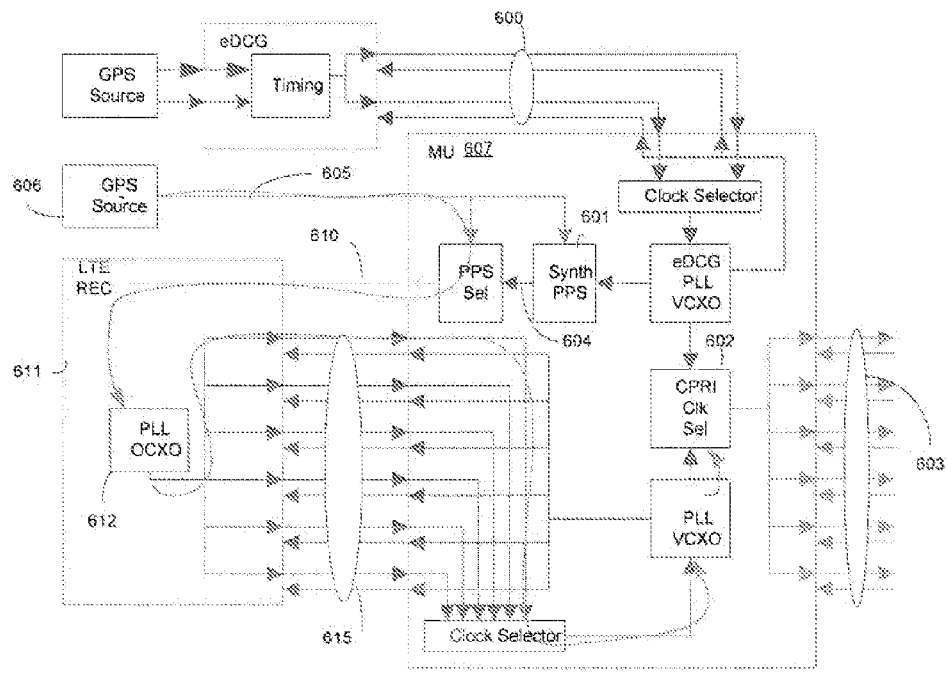
FIGS. 5a-5g are conceptual diagrams of the flow of timing through the system for various operational scenarios.
Figure 5B:
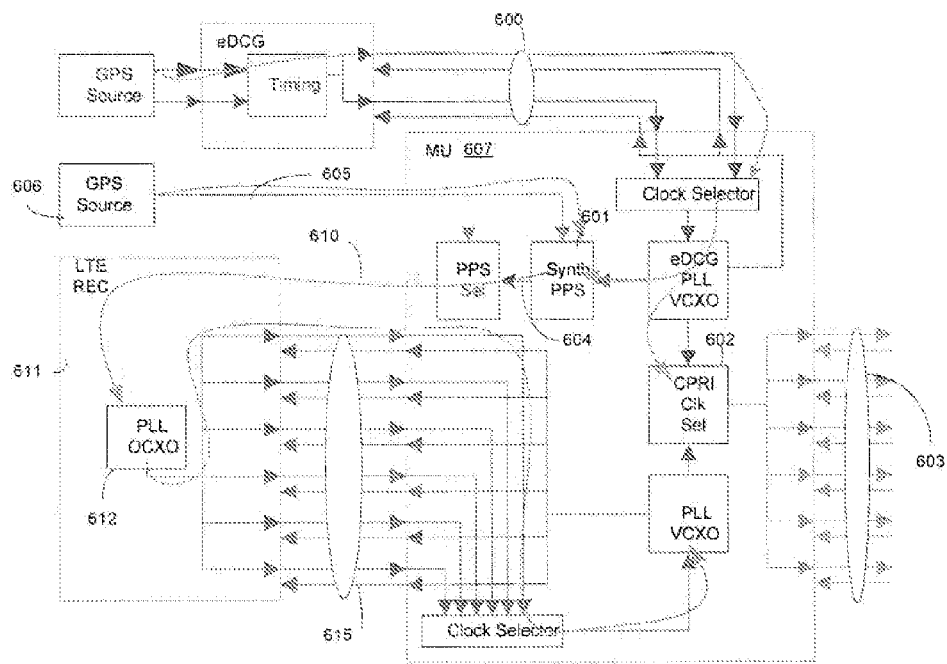
Figure 5C:
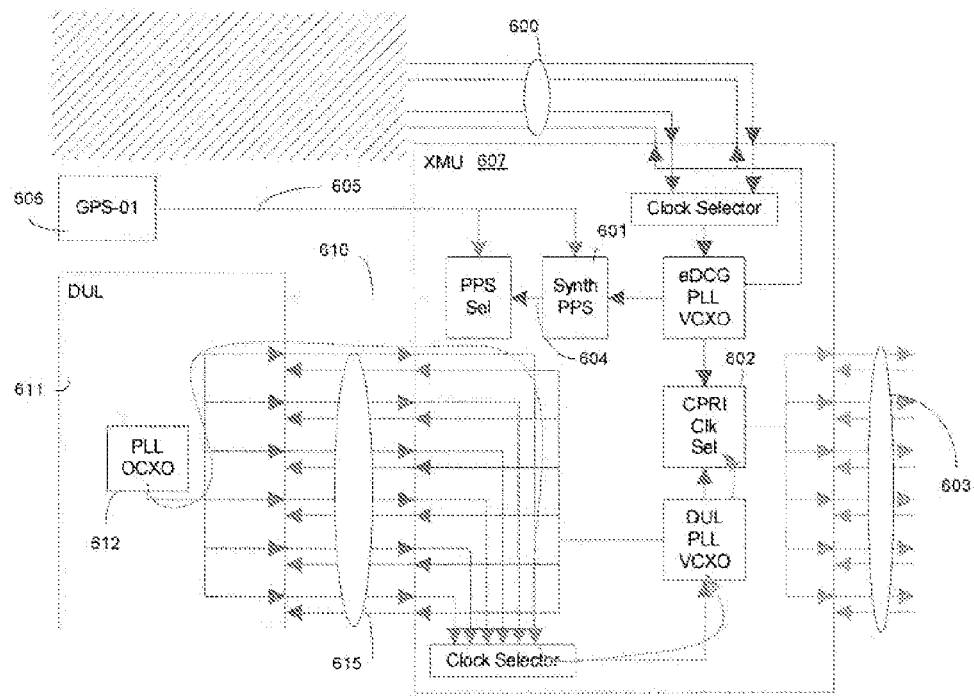
Figure 5D:
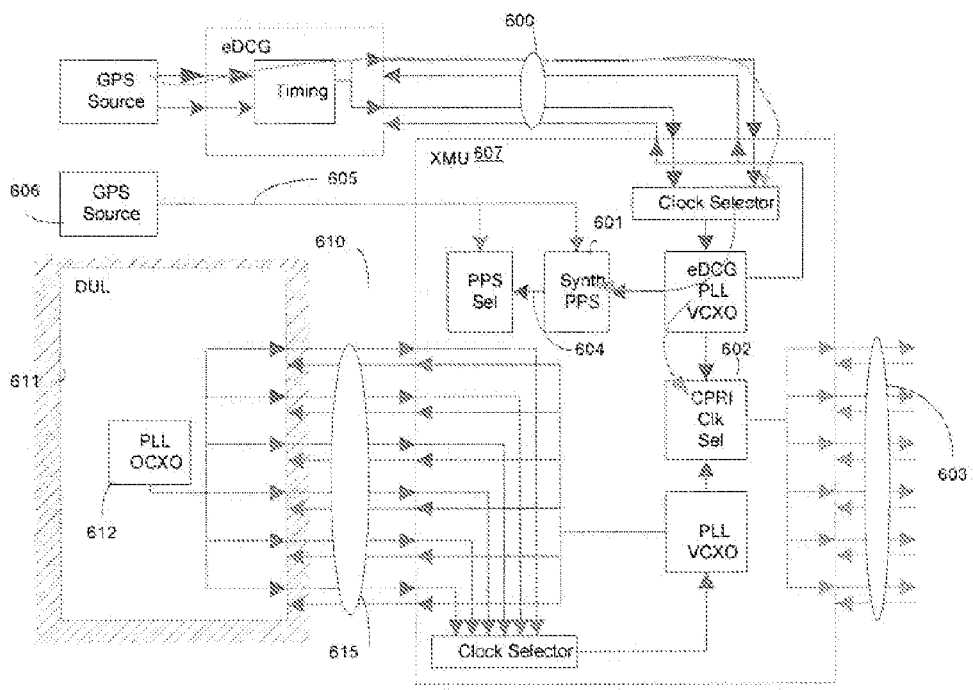
Figure 5E:
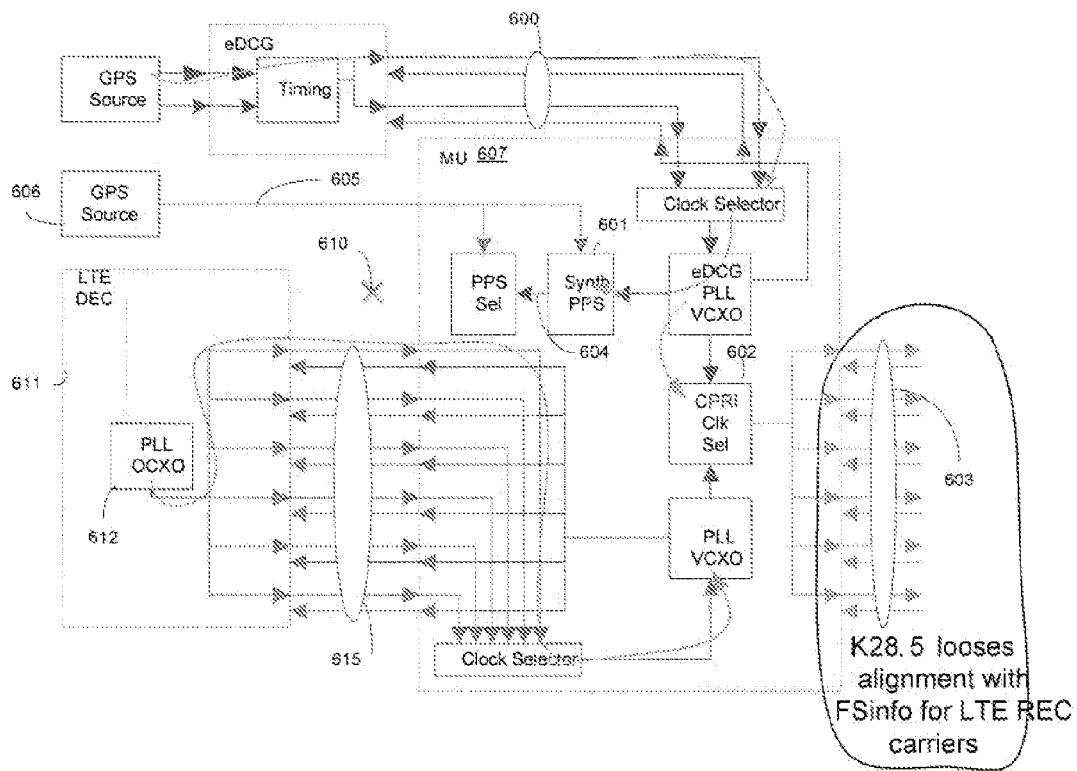
Figure 5F:
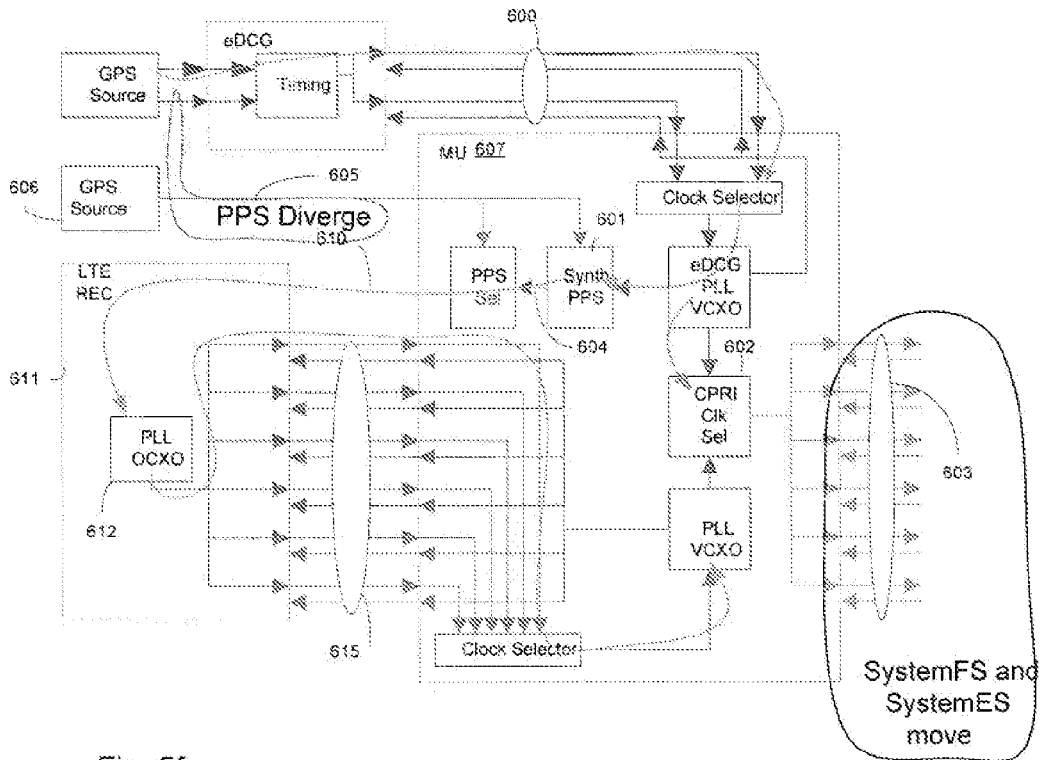

With reference to FIGS. 5a-5g, we will now describe the timing flows associated with various operational states and how timing synchronization of the CDMA and LTE networks is maintained. The scenarios described are as follows: FIG. 5a, GPS source is initialized; FIG. 5b, HSSL startup; FIG. 5c, holdover timing caused by HSSL link failure; FIG. 5d, LTE REC reset; FIG. 5e LTE REC holdover; FIG. 5f CDMA REC holdover; and FIG. 5g GPS source failure.

For each of the flow diagrams, a number of timing paths will be described and these are described as follows:
a) The group of paths, 600 represent clocking signals derived from the CDMA timing portion of the system. These paths feed into the synthetic PPS generation block 601 and into the CPRI clock selection block 602 for timing the CPRI links to the radios (group of paths 603);
b) Path 605 represent timing signals from the GPS source 606 to the MU 607 on the GPS interface cable (412 FIG. 4);
c) Path 610 carries the selected timing clock to the LTE REC 611, which is either comprised of the synthetic PPS 604 generated from the CDMA timing on paths 600 or the PPS generated from the GPS source 606 on path 605. The selected timing clock is fed into the LTE REC 611 and is used to train the OCXO 612 of the LTE REC 611;
d) The group of paths 615 represent the timing clocks on the CPRI links between the LTE REC 611 and the MU 607; and
e) The group of paths 603, represent the timing clocks on the CPRI links to the radios (not shown). These clock signals are either based on the HSSL link clocking or on the clocking from the CPRI links coming from the LTE REC 611. When the reference 1PPS clock, sent to the LTE REC 611 is generated from the HSSL link (ie. Via paths 600), the timing clocks on paths 603 are also selected as based on HSSL. When the reference 1PPS clock is from the GPS source 606, the timing clocks on paths 603 will be based on the CPRI links (paths 615) from the LTE REC 611.

Referring now to FIG. 5a, we have shown the timing flow after the GPS source 606 has been initialized. In this case, there is no HSSL timing (paths 600) available from the CDMA side of the network. The GPS reference signal 605 is derived from GPS source 606 for the LTE REC 611.

FIG. 5b illustrates the timing flow as the system switches from using the GPS source reference 1PPS clock signal 605 to using the HSSL-derived synthetic PPS clock signals 604. This can be thought of as part 2 of the initialization sequence. The initial procedure of switching to the synthetic 1PPS 604 is to line up the synthetic 1 PPS with the reference 1PPS clock signal 605 of the GPS source 606. Once this is done, the timing switches to the synthetic 1PPS and the CPRI clock selection switches to use the HSSL-derived synthetic PPS clock signals 600 for the timing on the CPRI links 603 to the radios. If during the measurement phase the HSSL links 600 are lost, the switchover to HSSL for timing is aborted. If the GPS source reference 1PPS signal 605 is lost, the switchover to HSSL for timing is aborted also. In this case there will no longer be a 1PPS signal going to the LTE REC 611, and the LTE REC 611 will be in holdover. If the LTE REC 611 resets during this switchover process, the switchover is not affected.

FIG. 5c illustrates a failure of the HSSL link 600 and in particular the timing that may occur immediately after, when the LTE REC 611 enters holdover. When the HSSL links fail, the system will switch back to either the GPS source reference 1PPS signal 605 if that signal has not drifted in relation to the lost HSSL signal timing 600, that is, the timing on the CDMA REC links 600 had remained aligned to the GPS source reference 1PPS. Otherwise, the LTE REC 611 will enter holdover for a while and base its timing on its OCXO 612. This will continue until its algorithm changes the GPS source reference 1PPS signal and begins to accept it.

In both cases the CPRI clock signal 603 will be based on the timing generated from the LTE REC CPRI links 615.

FIG. 5d, illustrates the timing when the LTE REC 611 is reset. The reset of the LTE REC does not impact the timing of the HSSL clock signal paths 600 through to the radios. The only difference is that the NMEA messages from the GPS source 606 and the synthetic 1PPS 610 sent to the LTE REC 611 do not arrive. When the LTE REC recovers, it will continue on as normal, receiving the 1PPS timing from the MU and driving the CPRI link timing for the CPRI links between the LTE REC and MU.

FIG. 5e illustrates the timing flow when the LTE REC goes into holdover. This can occur when the synthetic GPS signal 610 fails at the LTE REC. Another scenario is if the HSSL clock signal 600 has drifted, then failed (as illustrated in FIG. 6c) and the GPS source reference 1PPS signal 610 is rejected thus forcing the LTE REC to go into holdover.

If this occurs, the timing from the LTE REC would differ from the HSSL timing being used to drive the HSSL links. This would result in FIFO overflows and the LTE traffic would be shut down.

FIG. 5f illustrates the timing flow when the CDMA REC goes into holdover. This is detectable by monitoring the signal drift with the GPS source reference 1PPS signal.

When the CDMA network recovers from holdover, the fault should be cleared—except in the scenario where CDMA was in holdover when the MU switched to HSSL for timing. In that case, the phase of the PPS going to the LTE REC will differ from the GPS signal. The phase will then need to be lined up for the recovered HSSL clock.

Figure 5G:
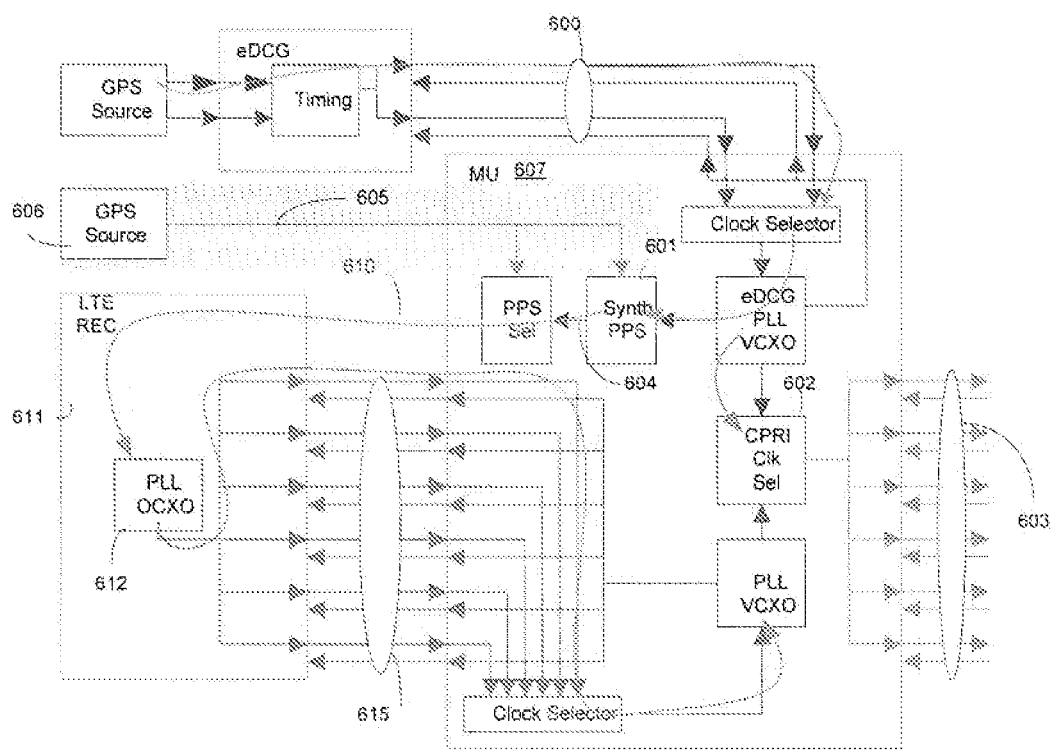

FIG. 5g illustrates the situation when the signal from GPS source 606 is lost.

Normally, GPS failure while HSSL is being used to drive the timing is not a critical failure—the NMEA messages sent by the GPS source 606 are cached in the MU and continue to be forwarded to the LTE REC. The exception is drift. When there is no reference 1PPS signal from the GPS source 606 to compare against, drift on the HSSL timing cannot be detected. This scenario may happen if, say for example, the GPS antenna, being used by the CDMA unit and the GPS source 606 connected to the MU, stops working. The GPS source 606 connected to the MU will stop emitting reference 1PPS signal and the CDMA unit will go into holdover.

The present invention can be realized in hardware, or a combination of hardware and software. Any kind of computing system, or other apparatus adapted for carrying out the methods described herein, is suited to perform the functions described herein. A typical combination of hardware and software could be a specialized computer system, e.g., a router, having one or more processing elements and a computer program stored on a storage medium that, when loaded and executed, controls the computer system such that it carries out the methods described herein. The present invention can also be embedded in a computer program product, which comprises all the features enabling the implementation of the methods described herein, and which, when loaded in a computing system is able to carry out these methods. Storage medium refers to any volatile or non-volatile storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form.

Thus, one embodiment is a computer readable medium containing computer readable instruction that, when executed by a processor, cause the processor to perform functions for maintaining clock synchronization between a first and a second radio.

In addition, unless mention was made above to the contrary, it should be noted that all of the accompanying drawings are not to scale. It will be appreciated by persons skilled in the art that the present invention is not limited to what has been particularly shown and described herein above. A variety of modifications and variations are possible in light of the above teachings without departing from the scope and spirit of the invention, which is limited only by the following claims.

We claim:

1. A method of providing timing synchronization between a first Radio Equipment Controller (REC) and a second REC operating with a multi-standard radio, comprising the steps of:
    receiving a synchronization signal from a first synchronization source;
    generating a synchronized data output derived from said synchronization signal;
    generating a first clock signal from said synchronized data output;
    reconstructing a synchronization source from said first clock signal; and
    aligning a timing and frequency component of a second clock signal to that of said reconstructed synchronization source, such that said second REC can maintain timing synchronization with said first REC.

2. A method as defined in claim 1, further comprising the step of storing, timing pulses associated with said synchronized data output.

3. A method as defined in claim 2, further comprising the step of emulating a synchronization source in accordance with said stored timing pulses.

4. A method of providing timing synchronization between a first Radio Equipment Controller(REC) and a second REC operating with a multi-standard radio, comprising the steps of:
    receiving at said first REC a synchronization signal from a first synchronization source;
    generating a synchronized data output derived from said synchronization signal;
    generating a first clock signal from said synchronized data output for use by said first REC;
    forwarding said synchronized data output to a timing source emulator and reconstructing a synchronization source from said first clock signal;
    generating a second clock signal from a second synchronization source; and
    aligning a timing and frequency component of said second clock signal to that of said reconstructed synchronization source, such that said second REC can maintain timing synchronization with said first REC.

5. A method as defined in claim 4, further comprising the step of storing, timing pulses associated with said synchronized data output.

6. A method as defined in claim 5, further comprising the step of emulating a synchronization source in accordance with said stored timing pulses.

7. A system of providing timing synchronization between a first Radio Equipment Controller (REC) and a second REC operating with a multi-standard radio, comprising:
radio means for receiving a synchronization signal from a first synchronization source;
first synchronization means for generating a synchronized data output derived from said synchronization signal;
second synchronization means for generating a first clock signal from said synchronized data output;
means for reconstructing a synchronization source from said first clock signal; and
means for aligning a timing and frequency component of a second clock signal to that of said reconstructed synchronization source, such that said second REC can maintain timing synchronization with said first REC.

8. A system for maintaining timing synchronization between a first Radio Equipment Controller (REC) having a first synchronization source, said first REC deriving synchronization there from and a second REC having a second synchronization source, each REC being connected and operating with a multi-standard radio, said system comprising:
a multiplexer connected to said first and second REC, said multiplexer monitoring said first and second synchronization source and said multiplexer having:
a first synchronization interface for receiving a first clock signal associated with said first synchronization source and for generating a clock signal synchronized to said first synchronization source;
a synchronization source emulator for receiving a second clock signal from said second synchronization source, said synchronization source emulator comparing and aligning a timing and frequency component of said second clock signal to that of said reconstructed synchronization source, such that said second REC can maintain timing synchronization with said first REC.

9. A system as defined in claim 8, wherein said synchronization source emulator further comprises a memory for storing timing pulses associated with said first synchronized clock signal.

10. A system as defined in claim 9, wherein said synchronization source emulator emulates said first synchronized clock signal from said stored timing pulses when said first synchronization source fails.

11. A system as defined in claim 10, wherein said synchronization source emulator measures clock signal offsets between said first and second synchronization source to determine if said first synchronization source is drifting relative said second synchronization source.

12. A system as defined in claim 11, where a new synchronization clock signal is triggered by said synchronization source emulator, if it detects a clock signal drift between said first and second synchronization sources.

* * * * *

UNITED STATES PATENT AND TRADEMARK OFFICE
CERTIFICATE OF CORRECTION

PATENT NO.        : 8,537,948 B2
APPLICATION NO.   : 13/287364
DATED             : September 17, 2013
INVENTOR(S)       : Przada et al.

It is certified that error appears in the above-identified patent and that said Letters Patent is hereby corrected as shown below:

In the Specification

In Column 6, Line 60, delete "1 PPS" and insert -- 1PPS --, therefor.

Signed and Sealed this
Eighth Day of July, 2014

Michelle K. Lee
*Deputy Director of the United States Patent and Trademark Office*